US008503617B2

(12) United States Patent
Watkins et al.

(10) Patent No.: US 8,503,617 B2
(45) Date of Patent: Aug. 6, 2013

(54) TELEPHONY TESTING (75) Inventors: David A. Watkins, Wylie, TX (US); Jamie A. Joyner, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 224 days.

(21) Appl. No.: 12/876,500

(22) Filed: Sep. 7, 2010

(65) Prior Publication Data

US 2012/0057682 A1 Mar. 8, 2012

(51) Int. Cl.
*H04M 1/24* (2006.01)
*H04M 3/08* (2006.01)
*H04M 3/22* (2006.01)

(52) U.S. Cl.
USPC ..................... 379/27.04; 379/10.03

(58) Field of Classification Search
USPC .......... 379/1.01, 26.01, 27.02, 27.04
See application file for complete search history.

(56) References Cited

U.S. PATENT DOCUMENTS

| 6,493,425 | B1* | 12/2002 | Abe .............................. 379/1.01 |
| 2006/0072709 | A1* | 4/2006 | Rancu et al. ................. 379/9.01 |
| 2007/0220392 | A1* | 9/2007 | Bhaumik et al. ............. 714/742 |
| 2007/0263773 | A1* | 11/2007 | Malik et al. .................. 379/1.01 |
| 2011/0055633 | A1* | 3/2011 | Vecera et al. .................. 714/32 |

* cited by examiner

*Primary Examiner* — Quoc D Tran (57) ABSTRACT

In a computer, a test script is received that includes a first set of commands to be provided to an Internet protocol (IP) telephone. The test script is parsed to obtain the first set of commands. Parameters that identify the telephone are obtained. The parameters and at least one of the first set of commands are used to obtain at least one corresponding second command from a conversion table. A command script is generated to be executed by the telephone, the command script including the at least one corresponding second command.

25 Claims, 5 Drawing Sheets

```
ENDPOINT ORIG Type=ORIG Switch=CISCOHANDSET
TG=POLYS99443 CallType=HANDSET Proto=CISCO
; ENDPOINT TERM Type=TERM Switch=CISCOHANDSET
TG=P30S039345 CallType=HANDSET Proto=CISCO onhook ORIG
  onhook TERM
  Delay Time=2000

;==== Start the 1st call =======================
  OffHook ORIG
  Display Message="ORIG went offhook"
  Delay time=2500

;Orig sending the called number
  presskeys ORIG keys=EP.Term.Number.10 wait=False
  Display Message="ORIG sent the called number:
[EP.Term.Number.10]"

; ORIG_ReceiveRingBack
  Display Message="Waiting for RINGING TONE..."
  ReceiveTONE ORIG Freq=480,440 Timeout=20000
  If ReceiveTONE.bSuccess=False Then
    Result False Message="No Ringing back"
  EndIf
  Display Message="ORIG heard Ringing back"
  delay time=2000

ReceiveEvent TERM EVENT="RING" nowait=True
  If ReceiveEvent.bSuccess=True Then
    Display Message="Terminating SIP phone was RINGING"
  Else
    Set Why="Terminating SIP phone did not RING"
    GoTo QUITANDFAIL
  EndIf
  Delay Time=3000

;TermOffHook
  Offhook TERM
  Display Message="Termination SIP phone2 went OffHook"
  Delay Time=4000

Display Message="Verifying Voice Path"

;===== Verify the voice path for the 1st call ====
  SendTONE TERM Freq=1004,1004 Time=5000
  Display Message="Term sent 1004 tone"
  ReceiveTONE ORIG Freq=1004,1004 Timeout=5000
  If ReceiveTONE.bSuccess=True Then
    Display Message="Orig received 1004 voice tone"
    StopVoice Term
  Else
    Set WHY="Orig DID NOT receive 1004 voice tone"
    GoTo QUITANDFAIL
  EndIf Display Message="Waiting for 1s"
  Delay Time=1000

SendTONE ORIG Freq=1025 Time=5000
  Display Message="Orig sent 1025 tone"
  ReceiveTONE TERM Freq=1025 Timeout=5000
  If ReceiveTONE.bSuccess=True Then
    Display Message="Term received 1025 voice tone"
    StopVoice Orig
  Else
    Set WHY="Term DID NOT receive 1025 voice tone"
    GoTo QUITANDFAIL
  EndIf Display Message="Keeping the call up for 1s"
  Delay Time=1000

;==== Test cases completed
  =========================
    RESULT True Message="Test completed successfully"

;==== Release all calls when calls fail and Clean ITP
resources ====
    QUITANDFAIL:
    ;In case of call failure be sure to clear originator before ITP
script ends
    onhook ORIG
    onhook TERM
    RESULT False Message=[WHY]
```

| Phone ID | Handset Key Name | Relay Number | XML Key |
|---|---|---|---|
| 001 | CompleteBlindTransferKey | 23 | SoftKey3 |
| 001 | CompleteConferenceKey | 31 | SoftKey1 |
| 001 | BeginConferenceKey | 23 | SoftKey3 |
| 001 | BeginBlindTransferKey | 27 | SoftKey2 |
| 001 | ON_HOOK | 1 | Headset |
| 001 | OFF_HOOK | 1 | Headset |
| 001 | POWER | 2 | |
| 001 | 1 | 4 | DialPad1 |
| 001 | 2 | 5 | DialPad2 |
| 001 | 3 | 6 | DialPad3 |
| 001 | 4 | 7 | DialPad4 |
| 001 | 5 | 8 | DialPad5 |
| 001 | 6 | 9 | DialPad6 |
| 001 | 7 | 10 | DialPad7 |
| 001 | 8 | 11 | DialPad8 |
| 001 | 9 | 12 | DialPad9 |
| 001 | 0 | 14 | DialPad0 |
| 001 | RIGHT_SOFT | 23 | SoftKey3 |
| 001 | VOLUME_DOWN | 16 | VolDown |
| 001 | VOLUME_UP | 17 | VolUp |
| 001 | HOLD | 18 | Hold |
| 001 | RIGHT | 22 | NavRight |
| 001 | MENU_UP | 25 | |
| 001 | HEAD_PHONE | 19 | Headset |
| 001 | UP | 28 | |
| 001 | MIDDLE_SOFT | 27 | SoftKey2 |
| 001 | LEFT | 30 | NavLeft |
| 001 | MENU | 29 | Menu |
| 001 | DIAL | 32 | Dial |
| 001 | LEFT_SOFT | 31 | SoftKey1 |
| 001 | MUTE | 20 | Mute |
| 001 | LINE2 | 21 | Line2 |
| 001 | LINE1 | 24 | Line1 |
| 001 | INFORMATION | 26 | |
| 001 | SPEAKER | 3 | Handsfree |
| 001 | BeginTransferKey | 27 | SoftKey2 |
| 001 | CompleteTransferKey | 31 | SoftKey1 |

| Script command | XML to Phone | XML from Phone |
|---|---|---|
| OffHook orig | GET /XmlApiWebServices/sdk/phone/polycom/PerformAction.aspx?key=Headset HTTP/1.1<br>Host: 166.34.96.128<br>Accept: image/bmp, application/xhtml+xml, application/x-com-polycom-spipx<br>User-Agent: Microbrowser/1.1 PolycomSoundPointIP-SPIP_450-UA/3.1.3.0439 | HTTP/1.1 200 OK<br>Server: Microsoft-IIS/6.0<br>X-Powered-By: ASP.NET<br>X-AspNet-Version: 2.0.50727<br>Cache-Control: private<br>Content-Type: application/x-com-polycom-spipx; charset=utf-8<br>Content-Length: 11<br><br>Key:Headset |
| PressKeys orig keys="9728441111" | GET /XmlApiWebServices/sdk/phone/polycom/PerformAction.aspx?key=9728441111 HTTP/1.1<br>Host: 166.34.96.128<br>Accept: image/bmp, application/xhtml+xml, application/x-com-polycom-spipx<br>User-Agent: Microbrowser/1.1 PolycomSoundPointIP-SPIP_450-UA/3.1.3.0439 | HTTP/1.1 200 OK<br>Server: Microsoft-IIS/6.0<br>X-Powered-By: ASP.NET<br>X-AspNet-Version: 2.0.50727<br>Cache-Control: private<br>Content-Type: application/x-com-polycom-spipx; charset=utf-8<br>Content-Length: 130<br><br>Key:DialPad9<br>Key:DialPad7<br>Key:DialPad2<br>Key:DialPad8<br>Key:DialPad4<br>Key:DialPad4<br>Key:DialPad1<br>Key:DialPad1<br>Key:DialPad1<br>Key:DialPad1 |
| OnHook orig | GET /XmlApiWebServices/sdk/phone/polycom/PerformAction.aspx?key=Headset HTTP/1.1<br>Host: 166.34.96.128<br>Accept: image/bmp, application/xhtml+xml, application/x-com-polycom-spipx<br>User-Agent: Microbrowser/1.1 PolycomSoundPointIP-SPIP_450-UA/3.1.3.0439 | HTTP/1.1 200 OK<br>Server: Microsoft-IIS/6.0<br>X-Powered-By: ASP.NET<br>X-AspNet-Version: 2.0.50727<br>Cache-Control: private<br>Content-Type: application/x-com-polycom-spipx; charset=utf-8<br>Content-Length: 11<br><br>Key:Headset |

TELEPHONY TESTING

BACKGROUND INFORMATION

Many different vendors provide Internet protocol (IP) telephones. Each vendor's IP telephones generally operate according to proprietary command sets that differ from command sets provided by other vendors. Further, each vendor's IP telephones may provide a control interface for receiving commands according to extensible markup language (XML) or the like, but these control interfaces are likewise generally vendor-specific. At present, when testing IP telephones of different vendors, mechanisms are lacking for controlling the IP telephones through a common interface or according to a common test script.

BRIEF DESCRIPTION OF THE DRAWINGS

FIG. 2 illustrates an example of a test script 135 in one exemplary implementation.

FIG. 4 provides an exemplary table that illustrates a relationship between commands from a test script, XML output from test module provided to a phone, and output from a phone that may be recorded as part of results of execution of the test script.

DETAILED DESCRIPTION OF PREFERRED EMBODIMENTS

Figure 1:
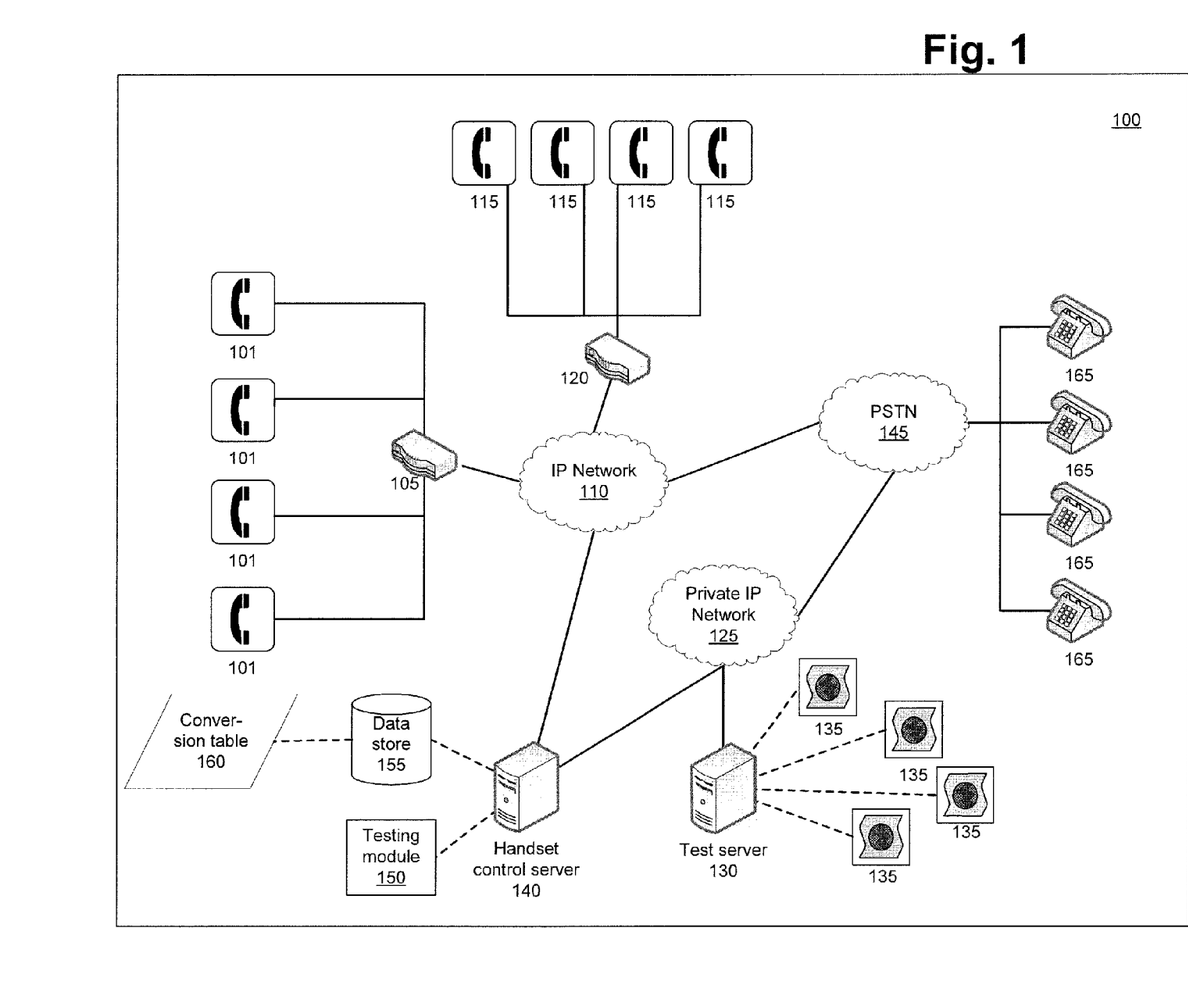
FIG. 1 illustrates an exemplary Internet protocol telephony test system.

FIG. 1 illustrates an exemplary system 100 for testing Internet protocol (IP) telephones 101. For example, IP telephones 101, etc. may communicate through a router 105 with an Internet protocol (IP) network 110. Other IP telephones 115, generally used for receiving calls from telephones 101, may likewise communicate with the network 110, e.g., through a router 120, or some other mechanism. It is to be understood that the number and configuration of IP telephones 101, 115 included in the system 100 may vary, and the telephones 101, 115, etc. are illustrated in FIG. 1 for purposes of example. IP telephones 101, 115 may be provided by a variety of vendors, e.g., Cisco Systems Inc. of San Jose, Calif., or Polycom, Inc., of Pleasanton, Calif., just to name a few.

IP telephones 101, 115 generally operate according to a signaling protocol such as Session Initiation Protocol (SIP), and generally use a standardized packet format, such as that defined by Real-time Transport Protocol (RTP). SIP and RTP are protocols generally used to provide services such as Voice over Internet Protocol (VoIP) services or the like; accordingly, VoIP services may be provided by telephones 101, 115. IP telephones 101, 115 are generally provided with a command language, generally proprietary to the vendor providing the telephones 101, 115, to allow the telephones 101, 115 to accept commands such as commands to dial a number, take a receiver off hook, etc. Further, IP telephones 101, 115 generally include an interface for receiving commands, e.g., according to a scripting for markup language such as extensible markup language (XML).

A private Internet protocol (IP) network 125 may be provided apart from the network 110. For example, the network 110 could be the Internet or some other wide area network (WAN), and the network 125 could be a local area network (LAN). However, it is to be understood that the network 110 and the private network 125 could be combined, and that operations described herein to either network 110 or network 125 could in fact be performed with respect to a single IP network.

A test server 130, generally having stored thereon one or more test scripts 135, may communicate with a handset control server 140 and a public switched telephone network (PSTN) 145 via the private network 125. IP network 110 may likewise provide connection to PSTN 145. Although not shown in FIG. 1, the networks 110 and 125 are generally connected to the PSTN 145 via respective gateways that provide for communications between a packet network and a circuit switched network.

Test scripts 135 generally include a set of commands to be provided a telephone 101 for purposes of testing the telephone 101. For example, a test script 135 could include commands for dialing a telephone number, commands for listening for a ring back, commands to be executed when a call is connected, etc., along with commands to be executed when various conditions occur, e.g., a ring back times out, a voice path for a call cannot be verified, etc. Thus, certain of the items in a test script include receiving and acting on control messages, e.g., SIP messages. FIG. 2 provides an example of a test script 135 in one exemplary implementation.

Handset control server 140 generally includes a testing module 150, e.g., a set of computer executable instructions stored on a computer readable medium included in or accessible by handset control server 140, the instructions including instructions for carrying out operations described herein. For example, the testing module 150 may be configured to retrieve and parse a test script 135 from test server 130. Further, the testing module 150 may access, from a data store 155 included within or accessible by handset control server 140, a conversion table 160.

The conversion table 160 may include a list of commands that may be provided from a test script 135, along with a rendering of that command in a command language suitable for a particular vendor's IP telephones 101. Further, the testing module 150 may be configured to insert commands for a vendor's telephone, retrieved from the conversion table 160, into an XML script formatted according to an XML schema or document type definition specified by a particular IP telephone vendor.

Figure 3:
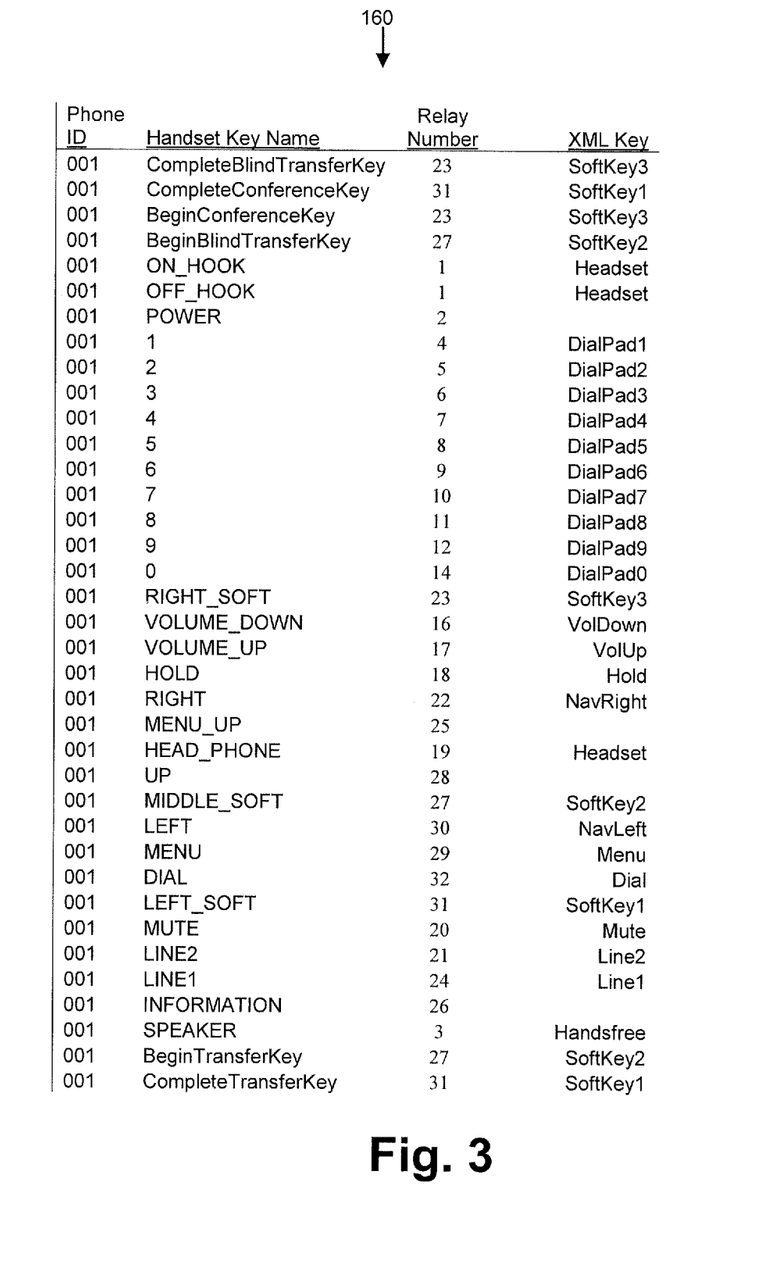
FIG. 3 illustrates a portion of an exemplary conversion table.

An exemplary conversion table 160, or at least a portion of a table 160, is illustrated in FIG. 3. The table 160 includes a plurality of records, each record having four fields, or columns. A first field provides an identifier for a particular vendor's IP telephone 101. Although not shown in FIG. 3, the first field could include one or more sub-fields sufficient to identify a particular IP telephone, e.g., according to a vendor identifier, a model identifier, etc. A second field provides a handset key name, e.g., a key in a numeric keypad, a volume key, a hold key, a mute key, etc. A third field provides a relay number, i.e., the number of a relay in the IP telephone 101 associated with the handset key. Opening and closing the relay generally performs operations associated with the handset key identified in the Handset Key Name column. A fourth field, referred to as the XML Key field, identifies a key name to be provided in an XML document to invoke a command associated with the Handset Key Name and Relay Number fields in the same record in which the key name is provided.

In the exemplary test system 100, telephones 101 are generally used for initiating calls that may be placed to telephones 115, or to plain old telephone service (POTS) telephones 165 that are connected to PSTN 145. Accordingly, various operations of telephones 101 may be tested within the environment of test system 100.

FIG. 4 provides an exemplary table 400 that illustrates a relationship between commands from a test script 135, XML output from test module 150 provided to a phone 101, and output from a phone 101 that may be recorded as part of results of execution of the test script 135. Thus, for an originating test phone 101, referred to as "orig" in table 400, a command such as "OffHook" may be described as provided from a test script 135. Further, the "XML to Phone" column shows XML generated by module 150 to be sent to the phone 101 to execute the "OffHook" command. The "XML from Phone" column shows XML returned by the phone 101 after the "OffHook" command has been executed. Other rows of table 400 show XML related to a command to dial a telephone number, and for executing an "On Hook" command.

Figure 5:
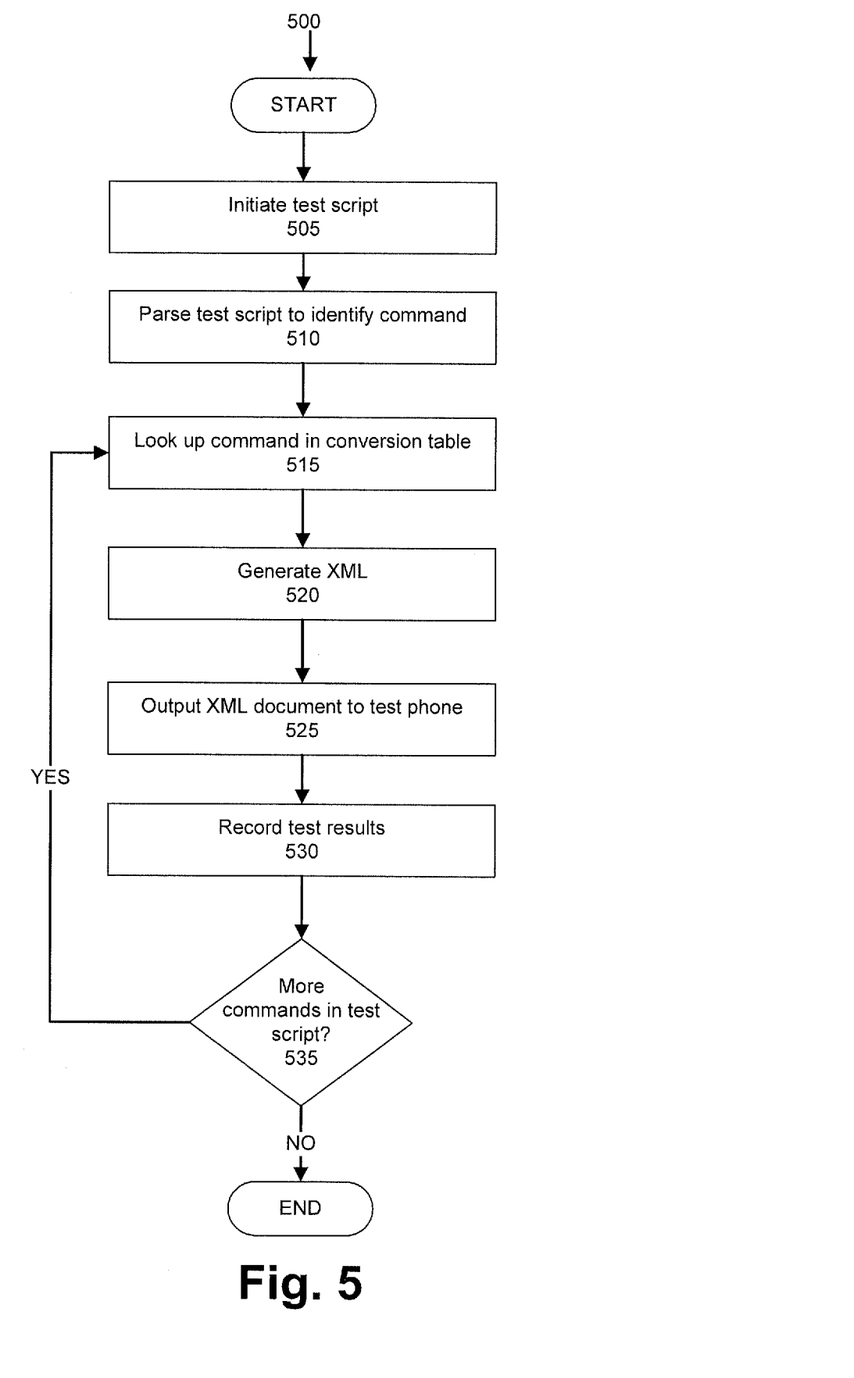
FIG. 5 illustrates an exemplary process for generating vendor-specific commands based on a test script.

FIG. 5 illustrates an exemplary process 500 for generating vendor-specific commands based on a test script 135.

Process 500 begins in a step 505, in which module 150 is invoked to execute a test script 135 for a phone 101, e.g., a phone identified by a vendor and model or other information sufficient to identify records and conversion table 160.

Next, in a step 510, the module 150 parses the test script 135 to obtain commands to be executed in the test phone 101.

Next, in a step 515, the module 150 looks up one of the commands obtained in step 510 in conversion table 160. For example, in one implementation, a stored procedure executes in data store 155, invoked by the module 150, to obtain from conversion table 160 commands for the test phone 101 with respect to which the test script 135 identified in step 505 is to be executed. Accordingly, parameters provided to the stored procedure could include identifiers for a particular vendor, phone model, etc. Such parameters could be provided as user input to the module 150, could be stored in a file or database table accessed by the module 150, etc.

Next, in a step 520, command XML, i.e., XML to be provided as output of the module 150 including the command for the phone 101, is generated. Command XML is sometimes referred to as a command script. In some implementations, output XML may be generated by the stored procedure mentioned with respect to step 515, and then provided to the module 150 for output. In yet other implementations, the entire module 150 may be implemented in a stored procedure in data store 155. Records of the table 400 discussed above with respect to FIG. 4 provide examples of such command, or output, XML in the "XML to Phone" column.

Next, in a step 525, the XML generated in step 520 is provided by the module 150 to a specified phone 101, e.g., a phone according to a vendor and model, generally at a specified IP address.

Next, in a step 530, the module 150 receives results from the execution of the test script 135, e.g., as XML received from the phone 101, and is depicted in the "XML from Phone" column of table 400. Such test results may be stored by the module 150, e.g., on a computer readable medium associated with handset control server 140, in data store 155, etc.

Next, in a step 535, the module 150 determines whether further commands have been obtained from the test script 135 but not looked up in the conversion table 160 or included in a command script. It further commands remain to be processed, then the process 500 returns to step 515 to process the next command. Otherwise, following step 535, the process 500 ends.

Although process 500 is described as including the generation of XML, it is to be understood that other formatting conventions and/or scripting languages could be used if understood by an IP telephone 101 to be tested. For example, command scripts could be in formats other than XML. Further, as noted below, steps of FIG. 5 could be executed in a different order than described herein. For example, instead of looking up a command in a conversion table 160, including the command in command XML, providing the command XML to a test phone 101, and then looking up the next command in the conversion table 160, all commands could be parsed from the test script 135, looked up in conversion table 160, and included in respective command scripts that are then in turn provided to a test phone 101 as appropriate according to the test script 135.

Computing devices such as computer servers 130 and 140 may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. Computing devices in general may include any one of a number of computing devices, including, without limitation, a computer workstation, a desktop, notebook, laptop, or handheld computer, or some other computing device.

Computing devices such as servers 130 and 140, etc., generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database 115 may be any of a variety of known RDBMS packages, including IBMS DB2, or the RDBMS provided by Oracle Corporation of Redwood Shores, Calif.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving, in a computer, a test script that includes a first set of commands to be provided to an Internet protocol (IP) telephone;
   parsing the test script to obtain the first set of commands;
   obtaining parameters that identify the telephone;
   using the parameters and at least one of the first set of commands to obtain at least one corresponding second command from a conversion table; and
   generating a command script to be executed by the telephone, the command script including the at least one corresponding second command.

2. The method of claim 1, further comprising sending the command script to the telephone.

3. The method of claim 2, further comprising receiving from the telephone a script reporting on execution of the least one second command.

4. The method of claim 1, wherein the command script is formatted according to extensible markup language (XML).

5. The method of claim 1, wherein the at least one of the first set of commands is the first set of commands, and the at least one corresponding second command is a plurality of second commands respectively corresponding to each of the ones of the first set of commands.

6. The method of claim 1, wherein the conversion table identifies commands according to a particular vendor providing the telephone.

7. The method of claim 1, wherein the command script is formatted according to a specification provided by a vendor of the telephone.

8. A non-transitory computer-readable medium tangibly embodying computer-executable instructions including instructions for:
   receiving a test script that includes a first set of commands to be provided to an Internet protocol (IP) telephone;
   parsing the test script to obtain the first set of commands;
   obtaining parameters that identify the telephone;
   using the parameters and at least one of the first set of commands to obtain at least one corresponding second command from a conversion table; and
   generating a command script to be executed by the telephone, the command script including the at least one corresponding second command.

9. The medium of claim 8, the instructions further comprising instructions for sending the command script to the telephone.

10. The medium of claim 9, the instructions further comprising instructions for receiving from the telephone a script reporting on execution of the least one second command.

11. The medium of claim 8, wherein the command script is formatted according to extensible markup language (XML).

12. The medium of claim 8, wherein the at least one of the first set of commands is the first set of commands, and the at least one corresponding second command is a plurality of second commands respectively corresponding to each of the ones of the first set of commands.

13. The medium of claim 8, wherein the conversion table identifies commands according to a particular vendor providing the telephone.

14. The medium of claim 8, wherein the command script is formatted according to a specification provided by a vendor of the telephone.

15. A system, comprising:
    a computing device configured to:
    receive a test script that includes a first set of commands to be provided to an Internet protocol (IP) telephone;
    parse the test script to obtain the first set of commands;
    obtain parameters that identify the telephone;
    use the parameters and at least one of the first set of commands to obtain at least one corresponding second command from a conversion table; and
    generate a command script to be executed by the telephone, the command script including the at least one corresponding second command.

16. The system of claim 15, the computer further configured to send the command script to the telephone.

17. The system of claim 16, the computer further configured to receive from the telephone a script reporting on execution of the least one second command.

18. The system of claim 15, wherein the command script is formatted according to extensible markup language (XML).

19. The system of claim 15, wherein the at least one of the first set of commands is the first set of commands, and the at least one corresponding second command is a plurality of second commands respectively corresponding to each of the ones of the first set of commands.

20. The system of claim 15, wherein the conversion table identifies commands according to a particular vendor providing the telephone.

21. The system of claim 15, wherein the command script is formatted according to a specification provided by a vendor of the telephone.

22. The method of claim 1, wherein the conversion table includes a plurality of records, each record having four fields,
wherein a first field provides an identifier for a particular vendor's IP telephone, a second field provides a handset key name, a third field provides a relay number, and a fourth field identifies a key name configured to invoke a command associated with the second and third fields of the same record.

23. The medium of claim 8, wherein the conversion table includes a plurality of records, each record having four fields,
wherein a first field provides an identifier for a particular vendor's IP telephone, a second field provides a handset key name, a third field provides a relay number, and a fourth field identifies a key name configured to invoke a command associated with the second and third fields of the same record.

24. The system of claim 15, wherein the conversion table includes a plurality of records, each record having four fields,
wherein a first field provides an identifier for a particular vendor's IP telephone, a second field provides a handset key name, a third field provides a relay number, and a fourth field identifies a key name configured to invoke a command associated with the second and third fields of the same record.

25. The method of claim 1, wherein the test script includes at least a subset of dialing commands, listening commands, connected commands, and condition commands to form a test set, and
wherein parsing the test script to obtain the first set of commands includes parsing the test script to obtain the test set.

* * * * *

UNITED STATES PATENT AND TRADEMARK OFFICE
CERTIFICATE OF CORRECTION

PATENT NO. : 8,503,617 B2
APPLICATION NO. : 12/876500
DATED : August 6, 2013
INVENTOR(S) : David A. Watkins et al.

Page 1 of 1

It is certified that error appears in the above-identified patent and that said Letters Patent is hereby corrected as shown below:

On the title page item (75), second inventor's name

Replace "Jamie A. Joyner, Sachse, TX (US)" with Jaime A. Joyner, Sachse, TX (US).

Signed and Sealed this
Eighth Day of October, 2013

Teresa Stanek Rea
*Deputy Director of the United States Patent and Trademark Office*